(12) United States Patent
Doveri

(10) Patent No.: US 10,502,310 B2
(45) Date of Patent: Dec. 10, 2019

(54) COVER STRUCTURE FOR THE TRANSMISSION OF A MOTORCYCLE

(71) Applicant: Piaggio & C. S.p.A, Pontedera (PI) (IT)

(72) Inventor: Stefano Doveri, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 0 days.

(21) Appl. No.: 15/564,998

(22) PCT Filed: Apr. 13, 2016

(86) PCT No.: PCT/EP2016/058132
§ 371 (c)(1),
(2) Date: Oct. 6, 2017

(87) PCT Pub. No.: WO2016/166167
PCT Pub. Date: Oct. 20, 2016

(65) Prior Publication Data
US 2018/0119793 A1    May 3, 2018

(30) Foreign Application Priority Data

Apr. 16, 2015    (IT) .......................... 102015000011955

(51) Int. Cl.
*F16H 57/04* (2010.01)
*B60K 11/06* (2006.01)
(Continued)

(52) U.S. Cl.
CPC .......... *F16H 57/0416* (2013.01); *B60K 11/06* (2013.01); *B60K 17/00* (2013.01);
(Continued)

(58) Field of Classification Search
CPC .. F16H 57/0416; F16H 57/031; F16H 57/035; F16H 57/0489; B60K 11/06
See application file for complete search history.

(56) References Cited

U.S. PATENT DOCUMENTS 7,497,288 B2 * 3/2009 Tsukada ................... B60K 1/00
180/68.1
8,460,138 B2 * 6/2013 Unno ........................ F16H 9/18
474/29

FOREIGN PATENT DOCUMENTS

EP    1138591 A2    10/2001
EP    1880934 A2    1/2008
(Continued)

*Primary Examiner* — Patrick Cicchino
(74) *Attorney, Agent, or Firm* — Volpe and Koenig, P.C.

(57) ABSTRACT

A protective cover structure for a motorcycle transmission allows the entrance of clean air. The cover includes: a first cover member to protect the transmission members, longitudinally extending along a direction which coincides with the travel direction, from a receding front area, corresponding to the engine axis, to a rear area corresponding to the rear wheel drive axis, and an inlet hole positioned at an inlet port of the transmission at the receding front area; a second cover member overlapping the receding front area to protect the inlet hole, forming, with the first cover member, an air intake extending from an upper to a lower edge of the first cover member, defining an inlet section, oriented opposite to the motorcycle travel direction; and a baffle, disposed between the first and the second cover members at said air intake, forming a channel driving the air upwardly to the inlet hole.

13 Claims, 3 Drawing Sheets

(51) Int. Cl.
  *B60K 11/00*   (2006.01)
  *F16H 57/03*   (2012.01)
  *B60K 17/00*   (2006.01)
  *F16H 57/035*  (2012.01)
  *F16H 57/031*  (2012.01)

(52) U.S. Cl.
  CPC ......... *F16H 57/031* (2013.01); *F16H 57/035* (2013.01); *F16H 57/04* (2013.01); *F16H 57/0489* (2013.01)

(56)           References Cited

FOREIGN PATENT DOCUMENTS

| EP | 2019233 A1 * | 1/2009 | ........... F16H 57/028 |
| EP | 2019233 A1   | 1/2009 |                         |
| EP | 2020536 A2 * | 2/2009 | ........... F16H 57/031 |
| EP | 2474435 A1   | 7/2012 |                         |
| EP | 2827024 A1 * | 1/2015 | ........... F16H 57/031 |
| EP | 2827024 A1   | 1/2015 |                         |

* cited by examiner

COVER STRUCTURE FOR THE TRANSMISSION OF A MOTORCYCLE

The present invention relates to a cover structure for the transmission of a motorcycle, which is positioned at one side thereof for the protection of the transmission members transmitting the driving force from the engine to the rear wheel.

Such a cover structure therefore extends longitudinally in a direction which coincides with the direction of travel of the motorcycle, from a front area, which corresponds to the transmission members, to a rear area that substantially corresponds to the driven axis of the rear wheel.

The cover structure substantially plays a double role: on one hand it must prevent mud, dust, debris or water from entering in the transmission gears, also causing a substantial damage; on the other hand it must allow the circulation of air that is drawn through apertures specifically formed in the cover structure.

It is therefore intended that the air that is drawn in must be as free as possible of contaminants. In this connection, the motorized vehicle can possess any bodywork element that protects the openings from water and debris, but if this bodywork element is not present the risk of polluting the transmission gears can be high.

European patent application No. EP 2,474,435 A1 discloses an air intake structure with an opening formed on the exposed surface of the cover structure, but this position requires a protective body element to work properly.

European patent application No. EP 2,827,024 describes a cover structure for a CVT type transmission, which presents an air intake entrance on the top edge of the cover, facing upward, intended to be protected by a further bodywork element.

European patent application No. 1,138,591 instead shows a CVT transmission cover that has an air intake entrance positioned also at the upper edge of the cover, laterally oriented with reference to the vehicle, and with a U-shaped path formed in the of cover structure for introducing air to the filter.

European patent application No. 1,880,934 describes a cover structure for a CVT transmission in which the respective air inlet is located on the front edge of the structure, adjacent to the air intake for the air cleaner supplying the throttle body.

Finally, European patent application No. 2,019,233 discloses an air intake linear opening laterally arranged on a cover structure for a CVT transmission side surface, having an arrow shaped profile pointing toward the rear of the vehicle, and a labyrinth path leading the drawn air towards the filter. The opening, thin and having a remarkable length, defines a sideways oriented, with reference to the vehicle, entrance.

In conclusion, in the known examples of cover structures for a motorcycle or scooter transmission, the air inlets, conveying the air towards the transmission, have either a small size or they are intended to be protected by a bodywork member of the vehicle, and they are provided with a labyrinth path to prevent the transmission contamination by external agents such as dirt, dust or water.

The technical problem underlying the present invention is to provide a cover structure which allows to overcome the drawback mentioned with reference to the prior art.

This problem is solved by a cover structure as above specified and as defined in appended claim 1.

The main advantage offered by the cover structure according to the present invention lies in allowing the entrance of clean air, without the need of a protective bodywork element, from an air intake possibly having a wide opening.

The present invention will be described hereinafter in connection with a preferred embodiment thereof, provided to an exemplificative and non limiting purpose with reference to the accompanying drawings wherein.

Figure 1:
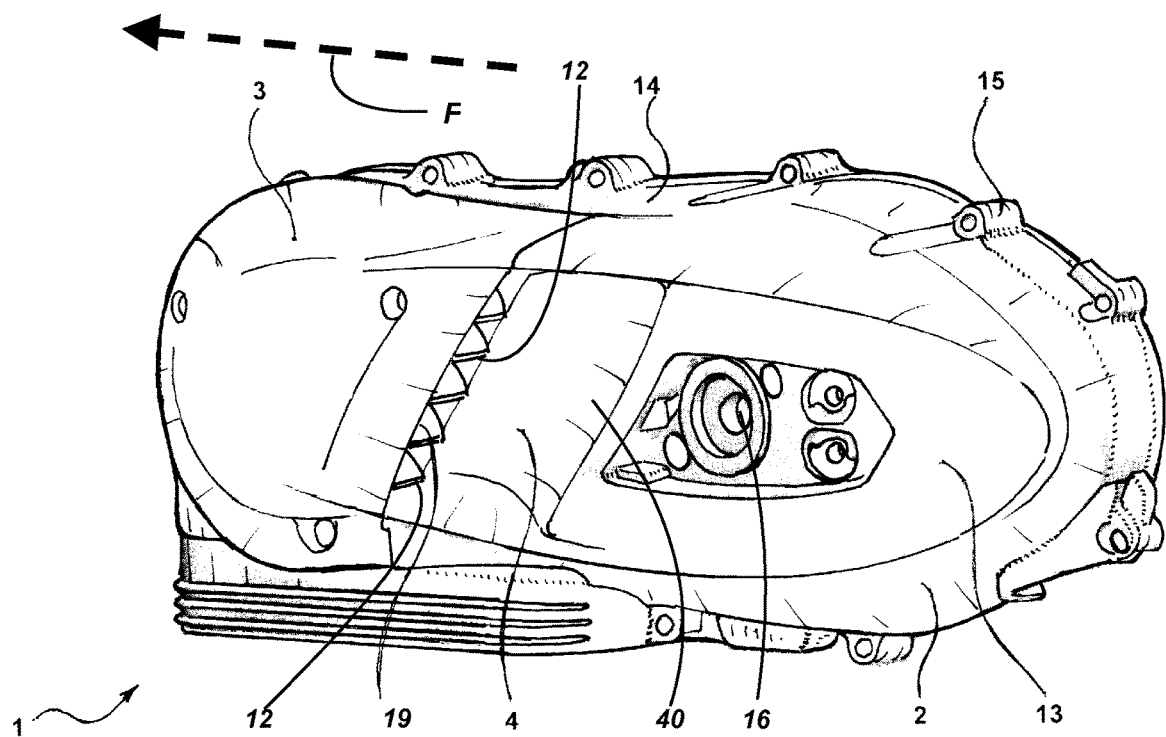
FIG. 1 shows a perspective view of a cover structure according to an embodiment of the present invention.

With reference to the figures, a cover structure is generally indicated as 1. It comprises a first cover member 2 apt to protect the transmission members, which extends longitudinally in a direction which coincides with the motorcycle direction of travel indicated as F, from a front area, which corresponds to the transmission, i.e. to the driving axis of the engine, to a rear area that substantially corresponds to the driven axis of the rear wheel.

The first cover member 2 comprises an inlet hole 6 for the cooling air of the gear members (not shown) that are part of the transmission components. This hole 6 is located at said front area.

In fact, the gear members, connected to the engine, also drive a suction fan (not shown) that draws air from a transmission inlet port formed in the crankcase thereof, and which is positioned at said front area of the first cover member 2; the fan is directly driven by an axis of said gear members, in particular the engine axis itself. The transmission, to a purely illustrative and non-limiting purpose, may be of the CVT type (continuous variable transmission).

Therefore, the inlet hole 6 is positioned at the transmission air port of the motorcycle, on said front area, i.e. at the fan driving axis, at which the first cover member forms a recess, producing dip or cavity on the first cover member 2 which extends over the whole front area, with the exception of the rear area 13 having a supporting hole 16 corresponding to the axis of the driven pulley (not shown).

Hence, the recess of the first cover member 2 and the front area thereof, in the present embodiment, overlap each other to form a receded front area 4, i.e. an area having an outer surface under the level of the rear area outer surface.

The first cover member 2 has flared edges apt to mate with a crankcase of the motor vehicle, to which the cover member is fixed by means bolts fitted within fixing holes 15, arranged on the contour of the first cover member 2.

The crankcase is metallic, while the cover members may be made of plastic material.

The structure 1 comprises a second cover member 3 partially overlapping said first cover member 2 at said front area, which is therefore at least partially covered.

In particular, the edges of the second cover member 3 substantially overlap the edges of the first cover member 2 at the front end thereof, i.e. the front edge of the second cover member 3 is located at the front end of the first cover member 2, and on the top and bottom edges of the first cover member 2.

Therefore, the second cover member 3, being physically separated from the first one, is meant to protect the inlet hole 6 and it partially covers the receding front area 4. The second cover member 3 is fixed on the first cover member 2 by means of screws fastened through holes 32, 34 of the second cover member 3 and said holes 9, 10, 11 of said first cover member 2. Between the first and second cover members 2, 3 a base plate 5 is sealed, in turn bolted to the first cover member 2. Even the base plate 5 has an opening which corresponds to the inlet hole 6.

Figure 3:
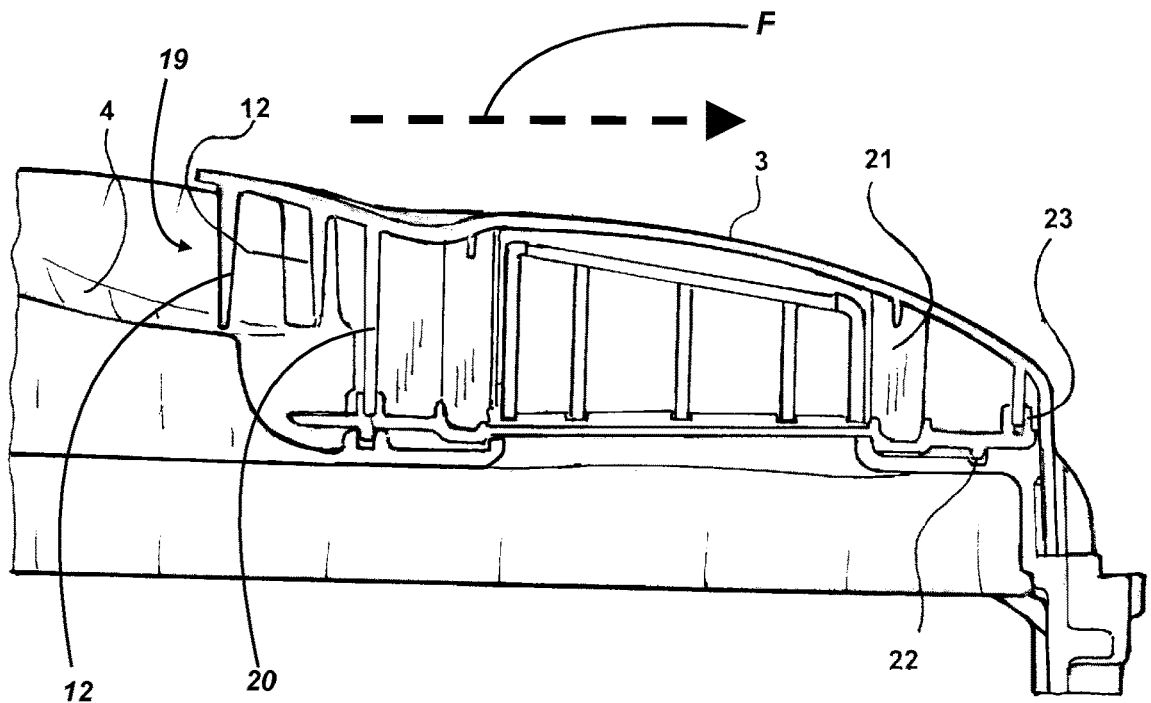
FIG. 3 shows a partial section of the cover structure of FIG. 1 at the air inlet hole.
Figure 4:
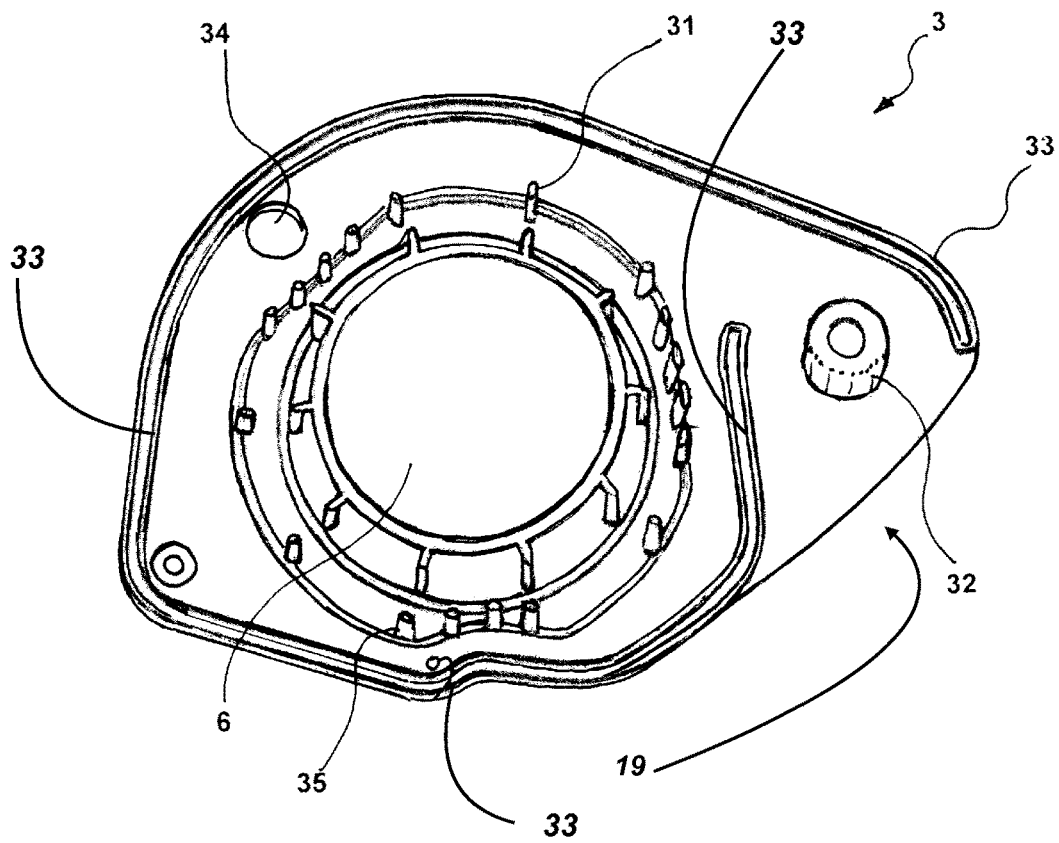
FIG. 4 shows a plan view of a base plate of the structure of FIG. 1.
Figure 5:
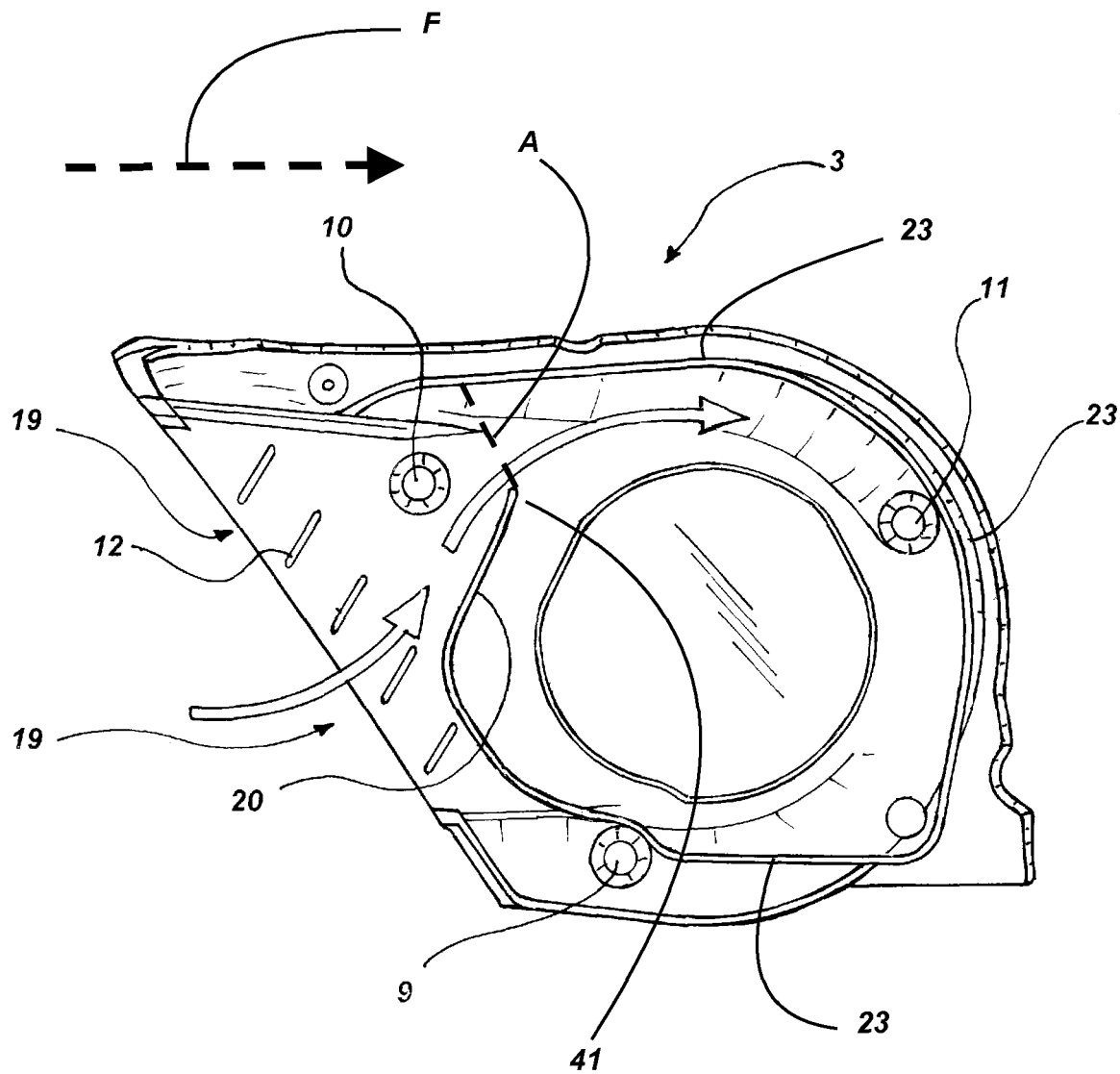
FIG. 5 shows a rear view of a cover member of the cover structure of FIG. 1, i.e. a view of the cover member surface directed toward the base plate of FIG. 4.

The edges of the second cover member 3 forms an airtight joint on the base plate 5 (FIG. 4) at the front end of the first cover member 2 and on the top and bottom edges of the first cover member 2, and in this regard the plate base 5 has a groove 33 contouring the inlet hole 6 and working as an airtight seat for an edge wall 23 perpendicularly projecting from the inner face of said second cover member 3 (FIGS. 3 and 5).

In addition, between the base plate 5 and the first cover member 2 a further seal 22 is formed, thanks to a rib projecting from the base plate 5, inserted in a corresponding groove of the first cover member 2.

At said receding front area 4 of the first cover member 2, the edge of the second cover member 3 is spaced from the surface of the first cover member 2, i.e. from the front area thereof.

At this edge, the second cover member 3 forms, together with the said first cover member 2, an air intake 19 at a portion of the receding front area 4 left uncovered by said second cover member 3.

The air intake 19 extends from an upper edge to a lower edge of the first cover member 2, and defines a wide air inlet section facing said rear area (FIGS. 1, 2 and 5), in the opposite direction to the conventional direction of travel F of the motor vehicle.

Figure 2:
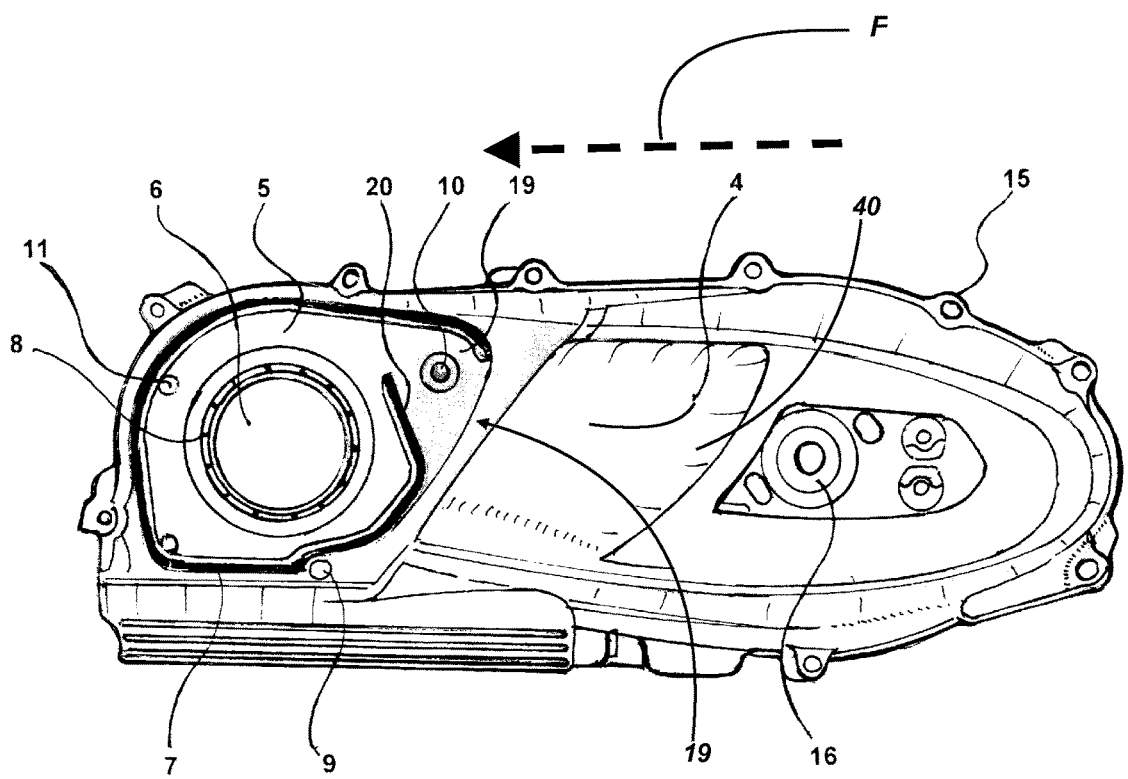
FIG. 2 shows a side partial section view of the cover structure of FIG. 1.

However, it is noted that said inlet section of the air intake 19 remains below the level defined by the outer surface of the second cover member 3 and from the level of the outer surface of the rear area 13 of the first cover member 2, inside the recess of the receding front area 4, and then adding a further protection (FIG. 1). The receding front area 4 is joined with the rear area 13 of the first cover member 2 by a sloped ramp 40, to avoid turbulence that would be produced by a step.

In particular, it is noted that the receding front area 4 occupies about two thirds of the overall longitudinal extension of the first cover member 2, while the second cover member 3 covers about one third of such extension, starting from the front end thereof.

The portion of the receding front area 4 left uncovered by the second cover member 3 achieves a calm zone from which an air flow is drawn.

In turn, the outer surfaces of the second cover member 3 and of the rear surface 13, having the same level with respect to each other, forms one outer flat surface, i.e. a common outer surface of the cover structure 1 improving the properties of the aerodynamic outline thereof.

The air intake 19 (FIGS. 1 and 2) has one end thereof, corresponding to said upper edge of the first cover member 2, that is positioned closer to the rear area 13 than the opposite end on the lower edge; the air inlet 19 thus presents a profile tilted towards the rear area 13.

Finally, the cover structure 1 comprises a baffle 20, disposed between the first and the second covering elements 2, 3 slightly inside the air intake 19, the baffle 20 being tilted in the opposite direction with respect to the air intake 19 in such a way to form a channel driving the air. Specifically, the baffle 20 perpendicularly protrudes from the inner face of the second cover member 3 (FIG. 5), and it is fitted into the groove 33 of the base plate 5 which receives the end thereof.

At the air intake 19, slats or fins 12 are formed between the first and the second cover members 2, 3; they are formed integral, as the baffle 20, with the second cover member 3 and they perpendicularly protrude from the inner face thereof (FIG. 5) towards the base plate 5.

Such slats 12, which form a substantially louvered structure at the air intake 19, are tilted as said baffle 20, in the opposite direction with respect to the inclination of the air intake 19 for driving the air drawn by the transmission upwardly to said inlet hole 6.

The base plate 5 also comprises a seat 8 defined by first teeth 31, arranged on the contour of said inlet hole 6, and the second teeth 35, arranged on a outer line concentric to the edge delimiting said inlet hole 6. The space between the first and second teeth 31, 35 can possibly be occupied by a filter 21, shaped as a ring.

It should be noted that, due to the above described geometry, said baffle 20 and the edge wall 23, a protected space is formed surrounding the whole inlet hole 6, with the air which is conveyed upwardly to it. In this way, debris and liquids that do, despite all the obstacles, enter the air intake 19 would fall in said annular space to accumulate below said inlet hole 6.

In particular, in the present embodiment and with reference to FIG. 5, the baffle 20 is the continuation of the edge wall 23 of said second cover member 3, partially contouring the inlet hole 6 to form said annular space within the space between the base plate 5 and the second cover member 3.

The baffle 20 has a terminal end 41 defining a narrowed inlet section A with respect to the air intake 19. As it can be seen, the narrowed inlet section A has a narrowed open area which is less or equal to 50% of the open area defined by the air intake 19.

From the inlet section of the air intake 19 to the narrowed inlet section A at the terminal end 41 of the baffle 20, the flow area gradually decreases as in a narrowing funnel formed by the baffle 20 and by the edge wall 23 of the second cover member 3, directing the air flow along a direction substantially tangential to the edge wall 23, which has a closed curved profile, i.e. a roughly circular profile encircling the inlet hole 6.

Thus, the air flow drawn inside the second cover member 3 increases the speed thereof passing from the air intake 19 to said narrowed inlet section A, so as to promote an air cyclonic circulation inside the second cover member 3, which eases the separation between the air and the possible debris including mud, dirt, dust and water.

In the above-described cover structure a man skilled in the art, in order to satisfy further and contingent needs, may realize several further modifications and variants, all however comprised within the scope of the present invention, as defined by the appended claims.

The invention claimed is:

1. A cover structure (1) for a motorcycle transmission, arranged sideways to protect a transmission member transmitting a driving force from an engine to a rear wheel, comprising:
   a first cover member (2) configured to protect said transmission members, longitudinally extending along a direction which coincides with a direction of travel (F), from a receding front area (4), corresponding to an engine axis, to a rear area (13) corresponding to a driven axis of the rear wheel, and comprising an inlet hole (6) positioned at an inlet port of the transmission at said receding front area (4);
   a second cover member (3) partially overlapping said receding front area (4) to protect said inlet hole (6), forming, with the said first cover member (2), an air intake (19) at a portion of the receding front area left uncovered by said second cover member (3), extending from an upper edge to a lower edge of the first cover member (2) and defining an air inlet section facing said rear area (13), oriented in a direction opposite to the motorcycle direction of travel (F);

a baffle (20), disposed between the first and the second cover members (2, 3) at said air intake (19), in such a way as to form a channel driving air upwardly to said inlet hole (6); and a base plate (5) arranged between the first and second cover members (2, 3), said base plate (5) having an opening corresponding to the inlet hole (6) and sealed to the first cover member (2), wherein the base plate (5) has a groove (33) contouring said inlet hole (6) and providing an airtight seat for an edge wall (23) perpendicularly projecting from an inner face of said second cover member (3) and partially contouring the inlet hole (6) having a closed curved profile, to form an annular space within a space between the base plate (5) and the second cover member (3).

2. The cover structure (1) according to claim 1, wherein said air intake (19) has an end thereof, corresponding to said upper edge of the first cover member (2), that is positioned closer to the rear area (13) than an opposite end on the lower edge, the air intake (19) having a profile tilted towards the rear area (13).

3. The cover structure (1) according to claim 2, wherein, at the air intake (19), slats (12) are formed between the first and the second cover members (2, 3) to form a louvered structure in correspondence with the air intake (19).

4. The cover structure (1) according to claim 3, wherein both said baffle (20) and the slats (12) are tilted according to a direction opposite to the tiling direction of the air intake (19) profile.

5. The cover structure (1) according to claim 1, wherein the base plate (5) further comprises a seat (8) contouring said inlet hole (6), for receiving a filter (21).

6. The cover structure (1) according to claim 1, wherein the inlet section of the air intake (19) remains below a level defined by an outer surface of the second cover member (3) and by an outer surface of the rear area (13) of the first cover member (2).

7. The cover structure (1) according to claim 6, wherein the front receding area (4) is joined with the rear area (13) by a sloped ramp (40).

8. A cover structure (1) for a motorcycle transmission, arranged sideways to protect a transmission member transmitting a driving force from an engine to a rear wheel, comprising:

a first cover member (2) configured to protect said transmission members, longitudinally extending along a direction which coincides with a direction of travel (F), from a receding front area (4), corresponding to an engine axis, to a rear area (13) corresponding to a driven axis of the rear wheel, and comprising an inlet hole (6) positioned at an inlet port of the transmission at said receding front area (4);

a second cover member (3) partially overlapping said receding front area (4) to protect said inlet hole (6), forming, with the said first cover member (2), an air intake (19) at a portion of the receding front area left uncovered by said second cover member (3), extending from an upper edge to a lower edge of the first cover member (2) and defining an air inlet section facing said rear area (13), oriented in a direction opposite to the motorcycle direction of travel (F); and a baffle (20), disposed between the first and the second cover members (2, 3) at said air intake (19), in such a way as to form a channel driving air upwardly to said inlet hole (6); wherein the inlet section of the air intake (19) remains below a level defined by an outer surface of the second cover member (3) and by an outer surface of the rear area (13) of the first cover member (2), the front receding area (4) is joined with the rear area (13) by a sloped ramp (40) and wherein said front receding area (4) generally occupies two thirds of an overall longitudinal extension of the first cover member (2), while the second cover member (3) covers one third of the overall longitudinal extension, starting from a front end thereof.

9. The cover structure (1) according to claim 1, wherein the baffle (20) is a continuation of the edge wall (23) of said second cover member (3).

10. The cover structure (1) according to claim 1, wherein, from an inlet section of the air intake (19) to a narrowed inlet section (A) at a terminal end (41) of the baffle (20), a flow area gradually decreases since the baffle (20) and the edge wall (23) of the second cover member (3) form a narrowing funnel directing an air flow along a direction substantially tangential to the edge wall (23) encircling the inlet hole (6).

11. The cover structure (1) according to claim 10, wherein said narrowed inlet section (A) defined by the terminal end (41) of the baffle (2) has a flow area which is less than or equal to 50% of a corresponding flow area defined by the inlet section of the air intake (19).

12. The cover structure (1) according to claim 1, wherein the front edge of the second cover member (3) is located at the front end of the first cover member (2), and a portion of the receding front area (4) left uncovered by the second cover member (3) achieves a calm zone from which an air flow is drawn through said air intake (19).

13. The cover structure (1) according to claim 12, wherein an outer surfaces of the second cover member (3) and of the rear surface (13) forms one outer flat surface, defining a common outer surface of the cover structure (1).

* * * * *